D. F. Neikirk.
Horse Hay Fork.

No. 66730        Patented Jul. 16, 1867.

Witnesses                Inventor

W. H. Bunnings            D F Neikirk.
A. W. McClelland

United States Patent Office.

D. F. NEIKIRK, OF REPUBLIC, OHIO.

Letters Patent No. 66,730, dated July 16, 1867.

---

IMPROVEMENT IN HORSE HAY-FORKS.

---

*The Schedule referred to in these Letters Patent and making part of the same.*

---

TO ALL WHOM IT MAY CONCERN:

Be it known that I, D. F. NEIKIRK, of Republic, in the county of Seneca, and State of Ohio, have invented certain new and useful Improvements in Hay-Forks; and I do hereby declare that the following is a full and complete description of the construction and operation of the same, reference being had to the accompanying drawings, making a part of this specification, in which—

Like letters of reference refer to like parts in the views.

Figure 1:
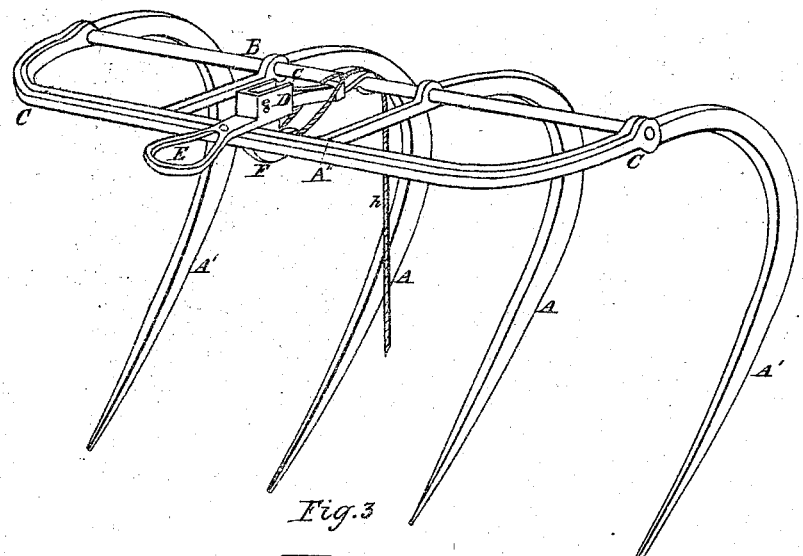
Figures 1 and 2 are perspective views of the fork in different positions.

My present invention is designed as an improvement in the hay-fork patented by me February 23, 1864.

My said improvement consists in giving a curved or angular form to the teeth or tines, applying a loop to the bail, and arranging a spring-catch on the central support, which is between the central cross-pivot and the bail; these features or changes enabling me to construct the hay-fork on the same general plan as that described in my patent above referred to, while they also enable me to greatly enhance the utility of the fork for general purposes.

One of the leading characteristics of my patented fork, and the one on which I now claim an improvement, is this: The two outer tines are terminated in a wrought-iron or steel head. To this head the two inner tines are fastened, and all the tines are pivoted, near the middle of their length, or at the curve or at the angle thereof, to a strong cross-rod or bar, which rod is supported by a strong central stay of the bail, and by the two arms or ends of the bail itself. It is only in connection with a hay-fork of this construction that I claim a patent for the improvements I shall hereinafter describe, and which are represented in the drawings.

Figure 3:
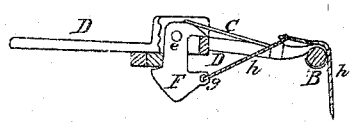
Figure 3 is a detached section.
Figure 2:
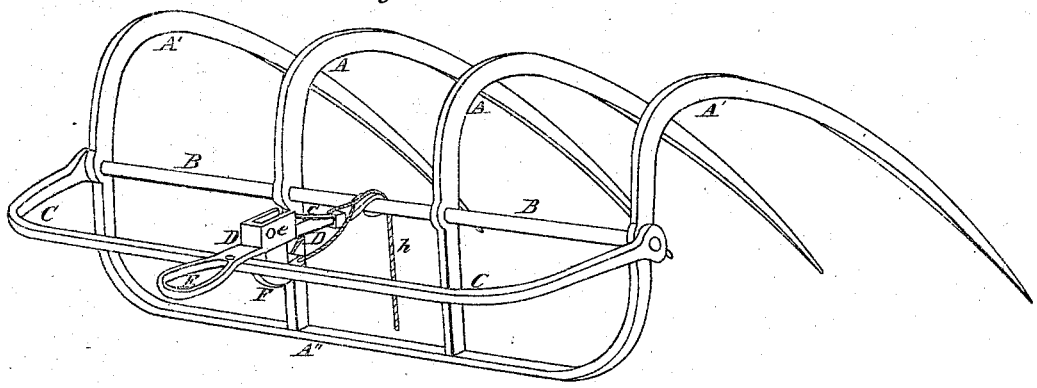

A A' represent the prongs of the fork, of which there may be any desired number, formed as shown in figs. 1 and 2. The two outside prongs A' extend round at one end, as at A'', being made of one piece, forming the head of the rake, to which the other prongs are secured. Through all the prongs, at a suitable distance from the head or end A'', extends a rod, B, that the fork can turn on, and on the end of it is attached a head, C, which fits round on the outside of the head A''. At the centre of the head C is secured an arm, D, that is bent round or connected to the rod B at one end, and the other end is formed into a loop, E, to which the rope is designed to be connected that suspends the fork. In this arm, at e, is pivoted a catch, F, clearly seen in fig. 3, on the back end of which rests and presses a spring, c, that keeps the catch up against the head A'', as represented, securing the head C and A'' of the fork together, as in fig. 1. To the lower end of the catch, at g, is attached a cord or rope, h, whereby the catch is released from the head A'' to allow the prongs to turn down on the rod B for the purpose of taking up or discharging a load.

In using the fork, when it is let down upon the hay to take up a load, the head A'' is released from the catch and the prongs of the fork placed in the hay, when the head C is adjusted over on to the head A'' of the fork, and secured by the spring-catch F, when, by pulling on the rope that suspends the fork, the fork, with its load, is raised up, and can be swung over into the bay or place for its reception. Then, by pulling the cord h, the catch is removed from its hold on the head A'', when the gravity of the hay will at once cause the prongs to turn down and the hay will slide off into the bay. The fork is let down in this position for another load, when the prongs are sunk into the hay and the head C turned over on to the head A'', so that the catch will fasten on to the head of the fork, as before stated, being most convenient in its adjustment, and the fork, as constructed and arranged, operates with the greatest facility.

What I claim as new, and desire to secure by Letters Patent, is—

The hay-fork, with curved or angular tines, a central support, D, a bail which affords end supports and to which the hoisting-rope is attached, and a pivoted connection which passes through the fork at a point near the curve or at the angle of its tines, when such fork has its spring-catch arranged on the central support D, and also has a loop, E, attached to or formed on the bail, all of the said parts being arranged and operated substantially in the manner and for the purpose herein described.

D. F. NEIKIRK.

Witnesses:
JOHN S. SMITH,
CLARA SMITH.